United States Patent [19]

Armond

[11] Patent Number: 4,825,331

[45] Date of Patent: Apr. 25, 1989

[54] TAPE DEGAUSSER

[75] Inventor: Joseph A. Armond, River Forest, Ill.

[73] Assignee: Electro-Matic Products Co., Chicago, Ill.

[21] Appl. No.: 527,025

[22] Filed: Aug. 29, 1983

[51] Int. Cl.$^4$ .................................... H01F 13/00
[52] U.S. Cl. .................................... 361/151
[58] Field of Search ............... 361/37, 103, 106, 115, 361/105, 139, 160, 163, 144, 145, 149, 151, 384; 360/66; 335/284, 300

[56] References Cited

U.S. PATENT DOCUMENTS

| | | | |
|---|---|---|---|
| 3,218,522 | 11/1965 | Littwin | 361/145 X |
| 3,579,053 | 5/1971 | Littwin | 361/149 X |
| 3,885,200 | 5/1975 | Burkle | 361/103 |
| 3,938,011 | 2/1976 | Littwin | 361/151 |
| 4,502,100 | 2/1985 | Greenspan et al. | 361/384 |

Primary Examiner—Michael L. Gellner
Attorney, Agent, or Firm—Paul H. Gallagher

[57] ABSTRACT

A unit including a conveyor belt for carrying the tapes to be degaussed, wound on reels, past degaussing coils. The coils are arranged respectively below and above the path of the tapes, spaced along the path of the tapes, and oriented with the magnetic fields positioned at 90° angle to each other and both at 45° angle to the direction of movement of the conveyor. Booster coils are provided for selectively applying lesser and greater voltages to the degaussing coils. Cooling fans direct cooling air against the degaussing coils, and in both of opposite directions on each coil. Safety features include interruption of the operation upon excessive heat of the degaussing coils, too great or too little current to the coils, or too great or too low voltage applied from the main source.

5 Claims, 4 Drawing Sheets

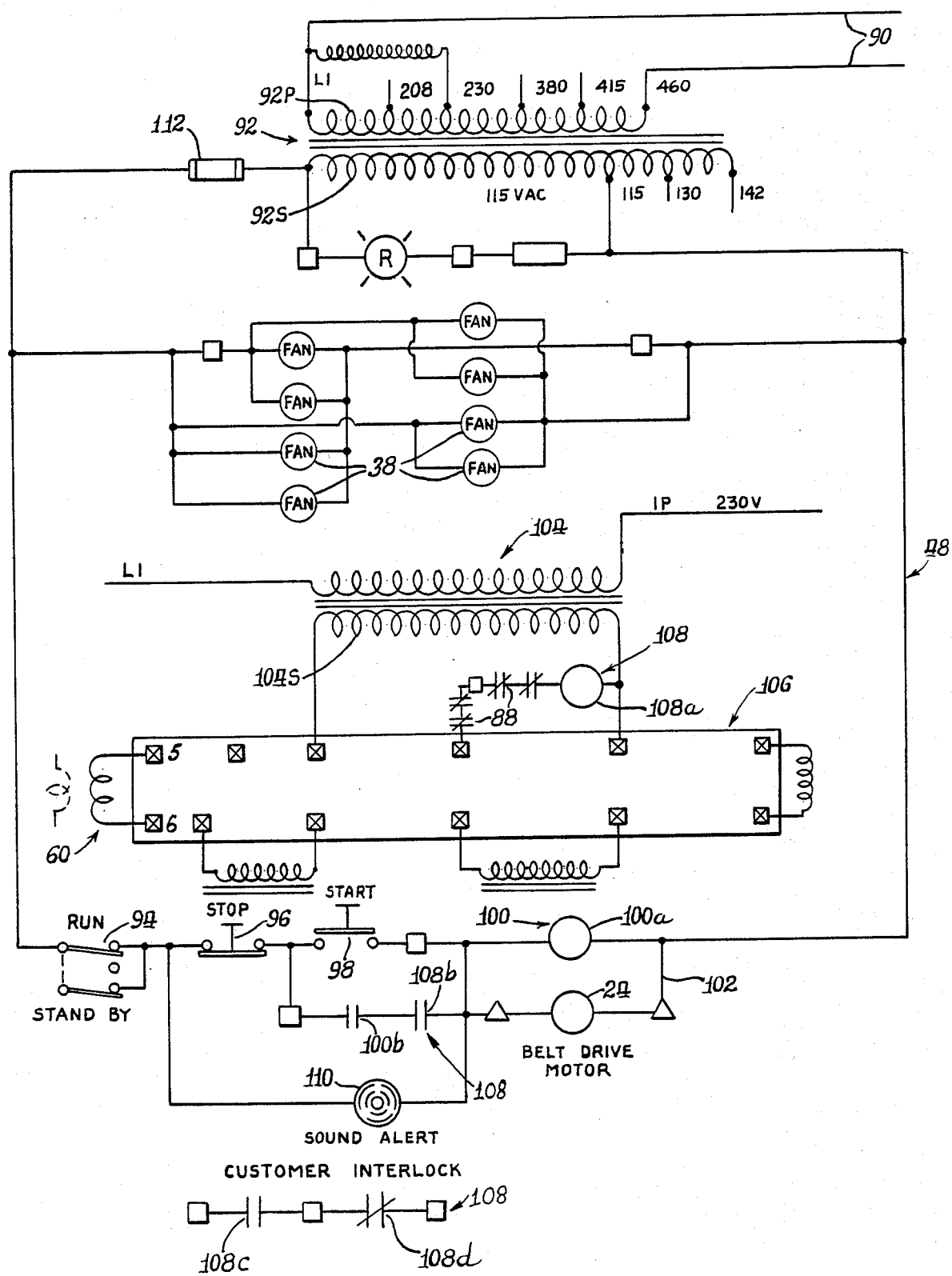

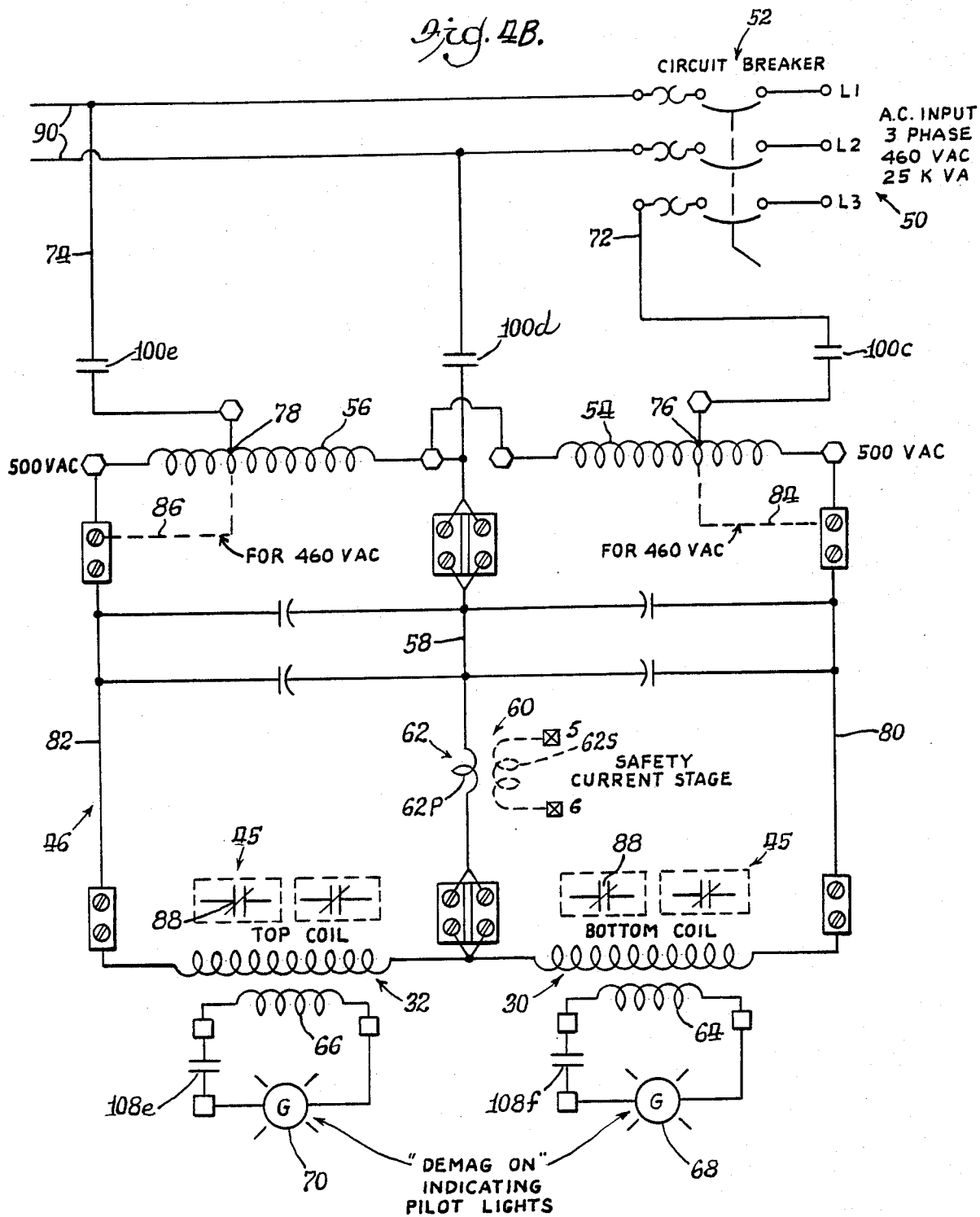

TAPE DEGAUSSER

FIELD OF THE INVENTION

The invention relates to degaussing magnetic tapes used for recording, for various purposes, such as in the computer field, and other fields. It is desired that they be degaussed in bulk, that is, when wound on a reel, and not linearly. They are subjected to degaussing coils, preferably AC transformers, the degaussing effect taking place in moving the tapes past them, i.e. in progressing in receding direction, the reversals in the AC continually reduce the magnetism in the tapes until it is reduced to zero, or substantially so.

OBJECTS OF THE INVENTION

A broad object of the invention is to provide novel tape degaussing apparatus and particularly one having the following features and advantages:

1. It includes a special arrangement of degaussing coils especially effective for producing the desired degaussing effect in a single pass of the tapes by them.

2. Booster coil means is provided, enabling the user to selectively utilize a greater or lesser voltage, according to the load of tapes to be degaussed.

3. Novel cooling means and arrangement are provided for cooling the degaussing coils, to accommodate greater development of heat occasioned by greater voltage.

4. Novel sensing and safety means are provided to assure normal operation.

DESCRIPTION OF A PREFERRED EMBODIMENT

In the drawings,

FIG. 4A is a diagram of a portion of the electrical circuit;

FIG. 4B is a diagram of another portion of the electrical circuit;

FIG. 5 is a fragmentary perspective view of one of the degaussing coils and a heat sensor component mounted thereon.

Figure 1:
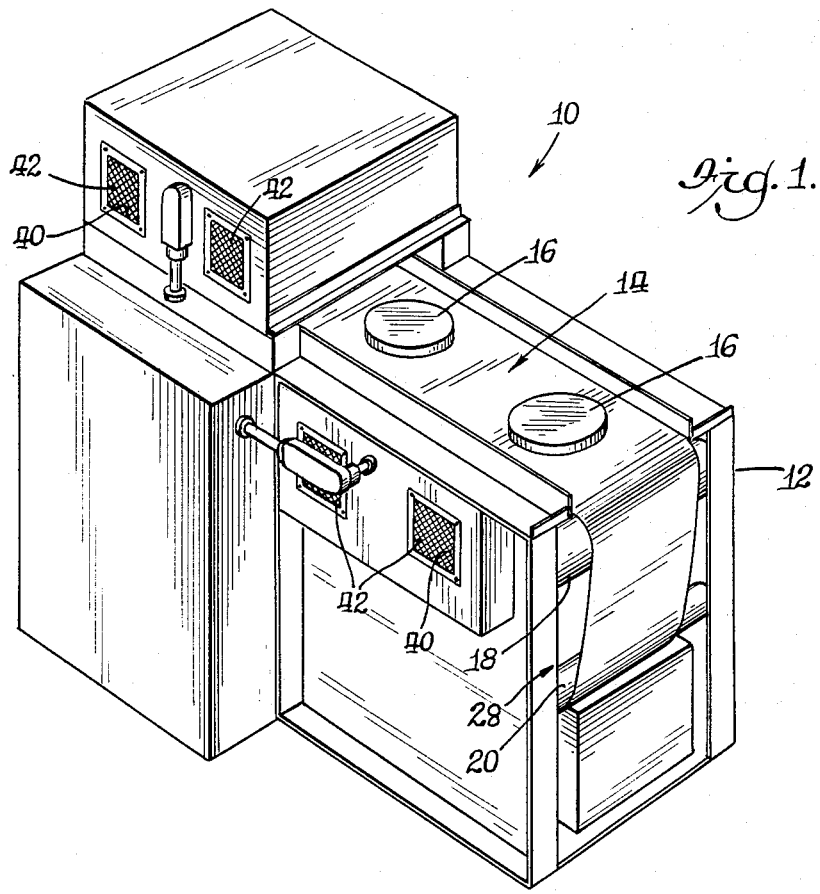
FIG. 1 is a perspective view of a tape degausser embodying the features of the present invention.

Referring in detail to the drawings, FIG. 1 shows the apparatus or machine 10 in its entirety and includes a cabinet 12 having a suitable frame and as a principal component a conveyor 14 in the form of an endless belt on which the tapes 16 are placed for the degaussing operation. The tapes 16 are wound on reels, and thus the tapes themselves are in the form of a solid mass, and are degaussed in such form, as contrasted with degaussing them in movement linearly of the tapes.

Figure 2:
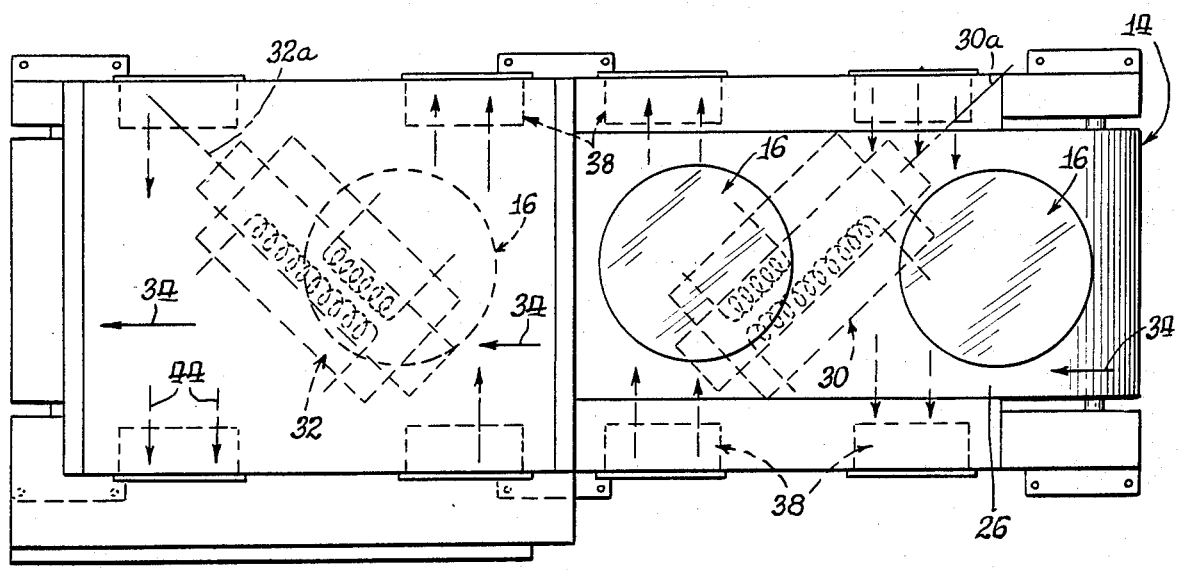
FIG. 2 is a top view of the degausser.
Figure 3:
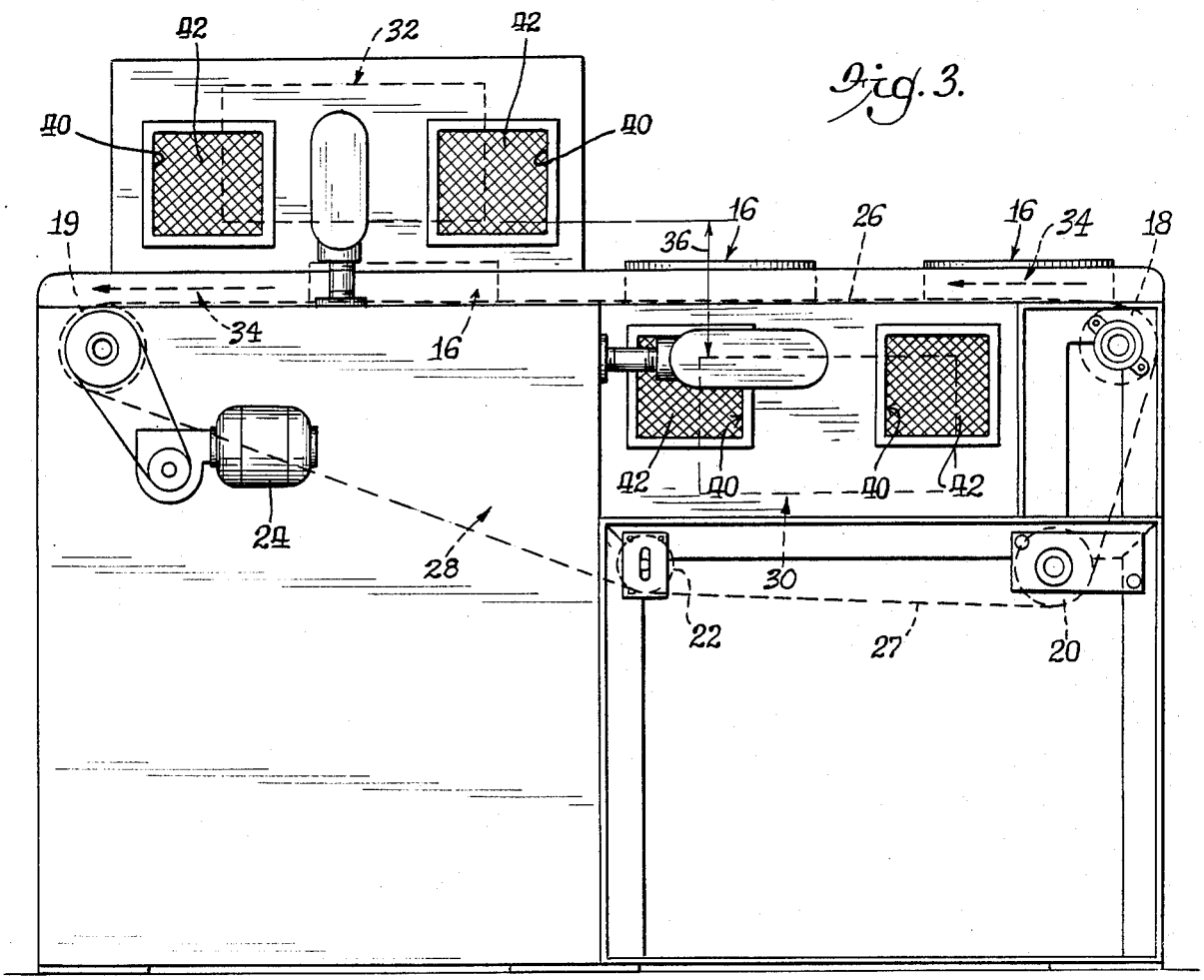
FIG. 3 is a side view.

FIGS. 2 and 3 show the components just referred to, the endless belt 14 being mounted on rollers 18 and 19, a belt tightener roller 20 and an idler roller 22. A suitable drive is provided, including a motor 24 acting through the roller 19. As shown in FIG. 3, the conveyor belt has an upper run 26 on which the tapes are directly placed, and the return run 27 is spaced below the upper run forming a space 28 in which one of the degaussing coils is placed, as referred to again hereinbelow.

The degaussing coils are shown at 30 and 32 and are constructed to provide magnetic fields oriented according to the lines 30a and 32b. The coils 30, 32 are placed relative to each other and relative to the position and movement of the conveyor belt in a certain predetermined manner. The belt travels in a predetermined path, the upper run from right to left (FIGS. 2 and 3) as indicated by the arrows 34. The coils are spaced along that path, the coil 30 being anterior and the coil 32 being posterior relative to that movement. The coil 30 is placed in the space 28 below the upper run 26 of the belt while the coil 32 is placed above that run. A vertical space 36 is thus provided between the belt coils to accommodate the reels of tape passing therethrough. In a third relationship, the coils 30, 32 are arranged with their respective magnetic fields, as indicated by the lines 30a, 32a at 90° to each other, and both at 45° to the direction of travel of the conveyor belt.

The angular disposition of the coils, relative to each other and relative to the direction of movement of the belt, provides complete and efficient degaussing or demagnetizing of the tapes, it being explained that a magnetic field lying only in a single direction is not always effective for completely demagnetizing an object, but with the two together, and arranged angularly as they are, all portions of the tapes are degaussed, regardless at what point circumferentially of the tapes the portions are disposed. Moreover, the 45° angular relation to the direction of movement of the belt provides a further degaussing action in that neither magnetic field is disposed either directly longitudinally or transversely of that movement, thus further providing accuracy of degaussing.

Figure 6:
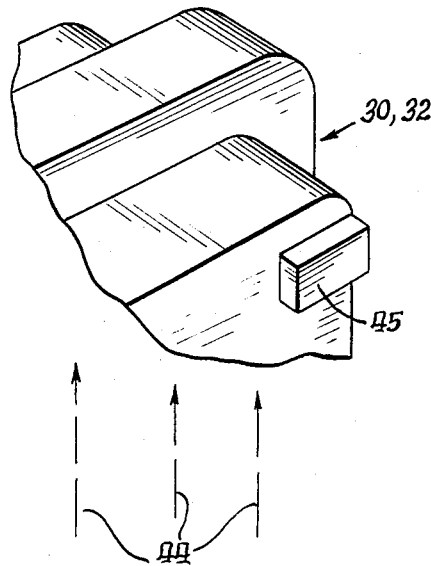
FIG. 6 is a fragmentary face view of a portion of the cabinet of the apparatus, mounting various controls and indicating elements.
Figure 7:
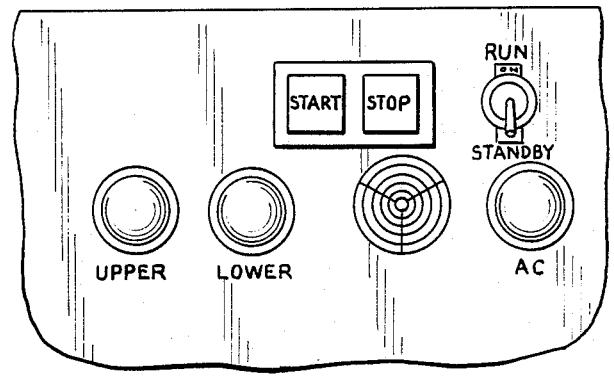

The degaussing coils 30, 32 are preferably positioned directly within the cabinet, and means is provided for cooling them accommodating the relatively high voltages and corresponding high heat generated. For producing the desired cooling effect, cooling fans 38 are provided, in association with openings 40, suitably covered with grills 42. There are eight such fans and openings provided, four for each coil, and two of them aligned transversely at each end of the respective coil. The aligned fans blow the cooling air in the same direction (FIG. 2) and the two pairs of aligned fans at each coil blow the air oppositely for maximum cooling effect. This opposite movement of the air is indicated by the arrows 44. Sensing means is provided for sensing the heat of the coils, and attention is directed particularly to FIG. 4B, diagrammatically indicating such a sensing element 45. This sensing element is mounted directly on the iron of the coil (FIG. 6) and thus made extremely sensitive to the heat thereof. This sensing element controls certain control elements in the electrical circuit, as referred to again hereinbelow.

Reference is now made to the electrical circuit of FIGS. 4A and 4B. The circuit includes two main sections, the power section 46 at the right and the control section 48 at the left. The degaussing coils 30, 32 are shown at the right, bottom.

The electrical circuit includes an AC source 50 having the usual circuit breaker 52, and included in the power section, are booster coils 54, 56 in series relation, connected across the degaussing coils which are also in series relation. A center tap conductor 58 leads from the AC source and is connected with the booster coils and the degaussing coils. In this center tap conductor is a safety current stage 60 which includes a primary coil 62P and a secondary 62S, the secondary leading to terminals #5 and #6. This current stage is also found in the control section at the far left. Associated with the demagnetizing coils are secondary coils 64, 66 leading to DEMAG indicating GREEN lights 68, 70.

In the power section 46, conductors 72, 74 leading from the AC source are tapped with the respective booster coils 54, 56 at points 76, 78 at positions less than the full value of the coil, while conductors 80, 82 are connected with the ends of the booster coils, and lead to the degaussing coils. Alternate conductors 84, 86 are connected respectively at the points 76, 78 and then with the conductors 80, 82, these alternate connectors providing lesser voltage to the degaussing coils. The booster coils 54, 56 and the alternate conductors 84, 86 are provided to enable the user of the apparatus to set the power of the degaussing apparatus at different voltage values, for example 460 V. or 500 V.

The power section 46 of the circuit also shows, diagrammatically, the sensing elements 45 referred to above. These sensing elements are shown in association with the degaussing coils in the circuit, and it is pointed out there are two for each of the coils. These sensing elements have internal contacts 88 that are normally closed, and upon the heat of the degaussing coils exceeding a certain predetermined value, these contacts are opened, according to the internal functioning of the sensing units. This type of sensing unit is known. These contacts 88 are shown in the control section 48 (FIG. 4A) at the center.

Referring to the control section 48 of the circuit, conductors 90 lead from the AC source to a main control transformer 92 in the control circuit. Connected across the secondary of this transformer are the cooling fans 38 identified above.

Connected across the secondary 92S, at the bottom of the control section, are the following controls in series: RUN/STANDBY switch 94, STOP switch 96, START switch 98, and relay 100. Associated with the relay is a holding circuit 102 including contacts 100b and the drive motor 24 (FIG. 3).

The control section 48 also includes a current transformer 104 connected with the main AC source at 230 V, and connected with a current sensing stage 106 which includes a relay 108 in series with the contacts 88, referred to above, in the sensing relays 45. The relay 108 includes contacts 108b in the holding circuit 102 (bottom). This relay also includes contacts 108c and 108d (bottom), which are incorporated in the customer's ordinary electrical circuit in which the apparatus is connected. Additionally, the relay 108 includes contacts 108e and 108f (right, bottom) in series with the signal lights 70, 68.

In the operation of the apparatus, the desired connection is made to the booster coils 54, 56 by connecting the conductors 84, 86 in the desired connection, and then the switch 94 (left, bottom) is switched to RUN position and then the main circuit breaker 52 is turned on. This supplies voltage to the main transformer 92 and the transformer 104. Upon energization of the transformer 92 the cooling fans 38 are turned ON. The degausser is now ready to be used and the next step is to close the START button 98, energizing the relay 100, closing the contacts 100c, 100d, 100e (right, upper), this energizing the booster transformers 54, 56, and the degaussing coils 30, 32.

As the degaussing coils 30, 32 are saturating, the current sensing coil 62P transfers a voltage to the terminals #5 and #6, which are incorporated in the sensing stage 106 (left, lower); when this voltage reaches a predetermined value, such as $1\frac{3}{4}$ V utilized here, the internal circuit of the sensing stage 106 energizes the relay 108 and closes the contacts 108b as well as actuating the contacts 108c, 108d (left, bottom) in the customer interlock.

In this situation, so long as the current in the degaussing coils 30, 32 remains within the desired range, the interlock contacts 108b remain closed, retaining the relay 100 energized. With this latter relay retained, the DEMAG indicating lights 68, 70 are ON, the conveyor belt drive motor 24 (left, bottom) remains running and the magnetic tapes can be placed on the conveyor belt.

A number of safety features are included in the apparatus and circuit; the circuit breaker 52 automatically opens if a short occurs in the circuit; the secondary 92S is fused at 112 which would interrupt upon excessive current developing due to a malfunction; the sensing stage 106 opens the interlock relays 108b, 100b; if one of the degaussing coils 30, 32 would short out, there would be a sudden rise of current and the relay 108 would then be de-energized; if one of the degaussing coils 30, 32 should fail to energize, or should open, a sudden drop in current would occur, again de-energizing the relay 108; if for any reason the customer's utility at the source 50 should exceed a certain limit, such as 520 V, or a lower limit, such as 420 V, the safety current stage 60 (left, lower) would operate to de-energize the relay 108; if the temperature of the deguassing coils should exceed a certain desired maximum temperature, such as 155° F. due to, for example, a defective cooling fan 38, the heat sensing elements 45 would function to open the contacts 88 therein (right, bottom, left, center), de-energizing the relay 108, this energization of course opening the interlock at 108b, 100b. Upon de-energization of the relay 108, the audible sound alert 110 would be energized. If the apparatus is to be serviced with the AC ON, and the degaussing coils OFF, then the switch 94 is switched to STANDBY.

I claim:
1. Tape degaussing apparatus comprising,
 a conveyor belt and means for moving it along a predetermined path, for carrying reels of tape thereon along the path,
 degaussing coils operable for performing a degaussing effect on the tapes in the path, positioned relative to the path, the degaussing coils being respectively
 (a) below and above the path and spaced therefrom to enable the reels to pass therebetween,
 (b) anterior and posterior, relative to each other, in the direction of movement of the conveyor belt,
 (c) producing magnetic fields on lines at 90° to each other and both at 45° to the direction of the path,
 said degaussing coils being connected in series,
 booster coils connected in series and together connected parallel with the degaussing coils, and operable for providing voltage of lesser or greater levels, respectively, and
 means for connecting the booster coils to the degaussing coils at different points on the booster coils for producing said lesser and greater levels, respectively, in the degaussing coils.
2. Tape degaussing apparatus according to claim 1 wherein, the degaussing coils are of substantial mass and capable of holding a great amount of heat, the apparatus includes cooling fans for directing cooling air on the degaussing coils, and sensing means mounted on the degaussing coils in heat conducting relation therewith for sensing the heat of the degaussing coils and operable for interrupting circuit to the degaussing coils in response to such heat exceeding the predetermined value.

3. Apparatus according to claim 2 and including, sensing means operable in response to current to the degaussing coils exceeding a predetermined value for interrupting circuit to the degaussing coils.

4. Apparatus according to claim 2 and including, sensing means operable in response to current to the degaussing coils falling below a predetermined value for interrupting circuit to the degaussing coils.

5. Tape degaussing means according to claim 2 wherein, the cooling fans are of such number and so arranged as to be operable to direct streams of cooling air against each of the degaussing coils in each of opposite directions.

* * * * *